Patented Oct. 6, 1953

2,654,769

UNITED STATES PATENT OFFICE 2,654,769

PREPARATION OF INDIUM ACETYLACETONATE

Alfred P. Kozacik and Edwin M. Nygaard, Woodbury, N. J., assignors to Socony-Vacuum Oil Company, Incorporated, a corporation of New York No Drawing. Application May 7, 1951, Serial No. 225,063

15 Claims. (Cl. 260—429)

Indium acetylacetonate is of great interest and importance as an intermediate in the synthesis of valuable indium organic compounds. Organic compounds of indium have important applications in many fields and have proved particularly valuable as fuel and lubricant additives for use in internal combustion engines. Methods for preparing such indium organic compounds in good yield are, therefore, being sought in order that the use of the compounds may be expanded. A compound of particular interest is indium acetylacetonate. The present invention is concerned with a novel and economical method of preparing this compound in high yield.

Indium acetylacetonate has been prepared previously by reacting an aqueous solution of indium nitrate, containing an excess of acetylacetone, with ammonia, the ammonia being added little by little so that the nascent indium hydroxide, immediately on its formation, was reacted with the acetylacetone. (See article by Morgan and Drew, J. Chem. Soc. 119, 1058 [1921]).

When an indium chloride solution is utilized rather than an indium nitrate solution in the method of Morgan and Drew, the method otherwise being the same, no formation of indium acetylacetonate product is obtained. This method, therefore, is not workable where it is required that the indium acetylacetonate be produced from indium trichloride, rather than from indium nitrate. In Example XIII, included hereinafter, the procedure described by Morgan and Drew was followed, except that indium trichloride was used rather than indium nitrate. As will be seen from that example, precipitation of the indium hydroxide occurred during the addition of the ammonium hydroxide and no indium acetylacetonate was formed in the reaction. A similar reaction using sodium hydroxide also failed to yield any indium acetylacetonate.

Morgan and Drew attempted to produce indium acetylacetonate from indium trichloride in chloroform solution but were unsuccessful. They also attempted the production of the acetylacetonate by reaction of acetylacetone with freshly precipitated indium hydroxide but without satisfactory results.

The present invention has to do with a method for producing high yields of indium acetylacetonate from indium trichloride as the starting material. In accordance with this invention, we have now found that indium trichloride may be utilized to prepare indium acetylacetonate in high yield by the method involving the following procedural steps: (1) forming an aqueous solution of indium trichloride and a hydroxypolycarboxylic acid, such as tartaric acid, said solution containing approximately 1 equivalent weight of trivalent indium per equivalent weight of the acid, (2) adding to the indium trichloride-acid solution an aqueous solution of a basic reagent, selected from the alkali metal hydroxides, the alkali metal carbonates and ammonium hydroxide, in sufficient amount to effect a change of the pH of the aqueous solution from the acid to the alkaline range, and (3) adding acetylacetone to the solution provided in step 2 to form the desired indium acetylacetonate product as a solid precipitate. The product is then recovered by filtration.

In carrying out our method, care must be exercised in the neutralization step, i. e., the addition of the basic reagent, since too rapid addition will tend to cause precipitation of indium hydroxide before the acid solution is completely neutralized. Where precipitation of indium hydroxide occurs, the yield of the desired acetylacetonate is, of course, reduced. This undesirable precipitation of the hydroxide has been one of the difficulties encountered in prior art methods, such as that used by Morgan and Drew. In the present method, however, careful addition of the basic reagent will avoid any precipitation of indium hydroxide. As the indium acetylacetonate is formed, the pH of the reaction solution will be lowered. However, by making additions of small amounts of the basic reagent from time to time during the addition of the acetylacetone reagent the pH of the solution may be controlled and the highest yield of acetylacetonate obtained. We have found the optimum pH range, i. e. the pH range which provides the best yields of acetylacetonate, to be in the lower portion of the alkaline range, i. e. approximately pH 8. Although the indium acetylacetonate precipitate forms rapidly, it is helpful to agitate the reaction mixture by stirring or shaking to insure as complete a recovery of the product as possible.

Although, as we have indicated, a pH of about 8 in the reaction insures the highest yield of acetylacetonate, the yield is not critically affected where a higher alkalinity is used. This is shown in Example XIV, wherein an excess of NaOH was used, the yield still being 82.3% as compared to 87.0% obtained in Example VIII where the pH was more closely controlled.

The hydroxypolycarboxylic acids which we have found to be particularly suitable for use in our invention are tartaric, citric and malic acids, although other structurally related acids are also useful in the invention. As non-limiting examples of such acids, there may be mentioned hydroxytartaric acid, tatronic acid, citramalic acid, dihydroxymalic acid, dihydroxytartaric acid and glycolic acid.

Of the basic salts, we have found that potassium hydroxide, sodium carbonate and ammonium hydroxide all give highly satisfactory results. These particular reagents have been evaluated in combination with the preferred acids, tartaric, citric and malic acids, the yields of indium acetylacetonate obtained varying from about 70 per cent to about 97 per cent of theoretical yield (based on the amount of indium trichloride used in the reaction), depending on the acid and basic reactant used. It was found, however, that the highest yields of indium acetylacetonate were obtained with citric acid, using sodium carbonate or ammonium hydroxide as the basic reagent (see Examples VI and VII) and with tartaric acid using ammonium hydroxide as the basic reactant (see Example III). A number of representative examples showing details of the procedural steps involved in the use of the various combinations of acid and basic reagents in the method of the invention are presented hereinafter. By reference to these examples a full understanding of the invention may be had.

EXAMPLE I

| Materials | Theoretical, Grams | Experimental, Grams |
|---|---|---|
| Indium Trichloride Solution (containing 58.3% InCl₃) | | 1.559 |
| Tartaric Acid (3 T. A.:2InCl₃) | 0.925 | 0.963 |
| Potassium Hydroxide | 1.380 | 1.440 |
| Acetylacetone | 1.240 | 1.460 |

*Procedure*

Tartaric acid solution (2.6 cc., N=4.94) was added to the InCl₃ solution contained in a 125 cc. glass-stoppered flask. A few drops of phenolphthalein indicator were added after which 12.7 cc. of potassium hydroxide solution (N=1.72) was added gradually; since a very small quantity of solids showed, 1–2 cc. of water was added to dissolve the solids, then 0.13 cc. of KOH solution was added. Next, 1.46 g. of acetylacetone was added gradually; on shaking, a white solid was obtained, after which 2.08 cc. of potassium hydroxide solution was added to restore the original pink end-point. The solid was extracted with benzene; the benzene solution was water-washed twice, then filtered through filter paper. After the benzene was evaporated, 1.355 g. of white solid remained. This represents a yield of 78.5% of indium acetylacetonate (based on indium trichloride). The melting point of the crude solid was 187° C. (literature (a) M. P.=186°–187° C.)

(a) J. Chem. Soc., 119 1058 (1921)

EXAMPLE II

| Materials | Theoretical, Grams | Experimental, Grams |
|---|---|---|
| Indium Trichloride Solution (containing 58.3% InCl₃) | | 1.567 |
| Tartaric Acid (3 T. A.:2InCl₃) | 0.930 | 0.963 |
| Sodium Carbonate | 1.310 | 1.260 |
| Acetylacetone | 1.250 | 1.460 |

*Procedure*

Tartaric acid solution (2.6 cc., N=4.94) was added to the InCl₃ solution contained in a 125 cc. glass-stoppered flask. A few drops of methyl orange indicator were added after which 13.85 cc. of sodium carbonate solution (N=1.71) was added gradually. The solution remained clear and 1.46 g. of acetylacetone was added. On shaking, a white solid was obtained. A few drops of sodium carbonate solution were added after which the solid was extracted with benzene. The solution was water-washed twice, then filtered through filter paper. After the benzene was evaporated, 1.3135 g. of white solid remained; this represents a yield of 77.4% of indium acetylacetonate (based on indium trichloride). The melting point of the crude solid was 186.5° C.

EXAMPLE III

| Materials | Theoretical, Grams | Experimental, Grams |
|---|---|---|
| Indium Trichloride Solution (containing 58.3% InCl₃) | | 1.243 |
| Tartaric Acid (3 T. A.:2InCl₃) | 0.738 | 0.815 |
| Ammonium Hydroxide | 0.688 | 0.704 |
| Acetylacetone | 0.989 | 1.170 |

*Procedure*

Tartaric acid solution (2.0 cc., N=4.94) was added to the InCl₃ solution contained in a 125 cc. glass-stoppered flask. A few drops of phenolphthalein indicator were added after which 3.75 cc. of ammonium hydroxide solution (N=5.03) were added. A very slight precipitate was noted, so 0.2 cc. of tartaric acid solution was added to dissolve this solid. Then, 1.17 g. of acetylacetone was added gradually; on shaking, a white solid was obtained. Since the indicator color was dispelled, additional (0.25 cc.) ammonium hydroxide was added to restore the color. The solid was extracted with benzene; on water-washing the solution, a "raggy" solid was noticed. This solid was, no doubt, due to slight hydrolysis of the indium acetylacetonate. The solution was filtered through a filter paper, then the benzene was evaporated to yield 1.2231 g. of white solid. This represents a yield of 90.5% of indium acetylacetonate (based on indium trichloride). The melting point of the crude solid was 186.5° C.

EXAMPLE IV

| Materials | Theoretical, Grams | Experimental, Grams |
|---|---|---|
| Indium Trichloride Solution (containing 58.3 % InCl₃) | | 1.450 |
| Tartaric Acid (3 T. A.:2InCl₃) | 0.860 | 0.870 |
| Sodium Hydroxide | 0.918 | 0.991 |
| Acetylacetone | 1.154 | 1.270 |

*Procedure*

Tartaric acid solution (2.4 cc., N=4.94) was added to the InCl₃ solution contained in a 125 cc. glass-stoppered flask. A few drops of phenolphthalein indicator were added after which 8.6 cc. of sodium hydroxide solution (N=2.58) was added gradually, then 1.27 g. of acetylacetone was added. On shaking, a white solid was obtained, after which 1.0 cc. of sodium hydroxide solution was added to produce a pink end-point. The solid was extracted with benzene; on water washing the solution, a "raggy" benzene-insoluble solid was noticed (see Example III). After water-washing, the solution was filtered through a filter paper. The benzene was evaporated to give 1.3494 g. of white solid. This represents a yield of 85.5% of indium acetylacetonate (based on indium trichloride). The melting point of the crude solid was 184.5–186.5° C.

EXAMPLE V

| Materials | Theoretical, Grams | Experimental, Grams |
|---|---|---|
| Indium Trichloride Solution (containing 58.3% $InCl_3$) | | 1.431 |
| Citric Acid (1 C. A.:1$InCl_3$) | 0.725 | 0.753 |
| Potassium Hydroxide | 1.320 | 1.270 |
| Acetylacetone | 1.160 | 1.270 |

*Procedure*

Citric acid solution (1.77 cc., N=6.92) was added to the $InCl_3$ solution contained in a 125 cc. glass-stoppered flask. A few drops of phenolphthalein indicator were added, after which 3.35 cc. of potassium hydroxide solution (N=1.72) was added gradually. Some cloudiness developed; on further addition of 7.0 cc. of potassium hydroxide a precipitate formed. Addition of 5.0 cc. of water caused a dispersion of the solid. Finally, 1.27 g. of acetylacetone was added gradually; on shaking the contents of the flask, a white solid was obtained. An additional 2.82 cc. of potassium hydroxide solution was added to give a pink end-point. After extraction with benzene and water-washing of the benzene solution in the usual manner the solution was evaporated to produce 1.14 g. of white solid. This represents a yield of 73.2% of indium acetylacetonate (based on indium trichloride). The melting point of the crude solid was 186.5–188° C.

EXAMPLE VI

| Materials | Theoretical, Grams | Experimental, Grams |
|---|---|---|
| Indium Trichloride Solution (containing 58.3% $InCl_3$) | | 1.532 |
| Citric Acid (1 C. A.:1$InCl_3$) | 0.776 | 0.797 |
| Sodium Carbonate | 1.284 | 1.300 |
| Acetylacetone | 1.220 | 1.280 |

*Procedure*

Citric acid solution (1.8 cc., N=6.92) was added to the $InCl_3$ solution contained in a 125 cc. glass-stoppered flask. A few drops of methyl orange indicator were added, after which 13.25 cc. of sodium carbonate solution (N=1.71) was added gradually, then 1.28 g. of acetylacetone was added. A precipitate soon formed on shaking the contents of the flask. An additional 1.10 cc. of sodium carbonate solution was added to restore the original end-point color. After extraction with benzene and water-washing the benzene solution in the usual manner, the solvent was evaporated to leave 1.611 g. of white solid. This represents a yield of 96.5% of indium acetylacetonate (based on indium trichloride). The melting point of the crude solid was 186.5–187.6° C.

EXAMPLE VII

| Materials | Theoretical, Grams | Experimental, Grams |
|---|---|---|
| Indium Trichloride Solution (containing 58.3% $InCl_3$) | | 1.525 |
| Citric Acid (1 C. A.:1$InCl_3$) | 0.772 | 0.797 |
| Ammonium Hydroxide | 0.844 | 0.942 |
| Acetylacetone | 1.210 | 1.460 |

*Procedure*

Citric acid solution (1.8 cc., N=6.92) was added to the $InCl_3$ solution contained in a 125 cc. glass-stoppered flask. A few drops of phenolphthalein indicator were added, then 4.8 cc. of ammonium hydroxide solution (N=5.03) was added. To the clear solution 1.46 g. of acetylacetone was added. A precipitate soon formed on shaking the contents of the flask. An additional 0.55 cc. of $NH_4OH$ solution was added to restore the pink end-point. After extraction with benzene and water-washing the solution in the usual manner evaporation gave 1.52 g. of white solid. This represents a yield of 91.6% of indium acetylacetonate (based on indium trichloride). The melting point of the crude solid was 186.5–187.6° C.

EXAMPLE VIII

| Materials | Theoretical, Grams | Experimental, Grams |
|---|---|---|
| Indium Trichloride Solution (containing 58.3% $InCl_3$) | | 1.471 |
| Citric Acid (1 C. A.:1$InCl_3$) | 0.746 | 0.797 |
| Sodium Hydroxide | 0.932 | 1.171 |
| Acetylacetone | 1.170 | 1.460 |

*Procedure*

Citric acid solution (1.8 cc., N=6.92) was added to the $InCl_3$ solution contained in a 125 cc. glass-stoppered flask. A few drops of phenolphthalein indicator were added, after which 7.8 cc. of sodium hydroxide solution (N=2.58) was gradually added. Since insoluble material was noted, the acetylacetone (1.46 g.) was added and then 3.55 cc. of sodium hydroxide solution was added to a pink end-point. During this addition a copious precipitate formed. The precipitate was extracted with benzene and the solution was water-washed twice. After the benzene was evaporated, 1.40 g. of white solid remained. This represents a yield of 87.0% of indium acetylacetonate (based on indium trichloride). The melting point of the crude solid was 186.5–187.6° C.

EXAMPLE IX

| Materials | Theoretical, Grams | Experimental, Grams |
|---|---|---|
| Indium Trichloride Solution (containing 58.3% $InCl_3$) | | 1.458 |
| Malic Acid (3 M. A.:2$InCl_3$) | 0.773 | 0.811 |
| Potassium Hydroxide | 1.292 | 1.560 |
| Acetylacetone | 1.160 | 1.460 |

*Procedure*

Malic acid solution (1.9 cc., N=6.37) was added to the $InCl_3$ solution contained in a 125 cc. glass-stoppered flask. A few drops of phenolphthalein indicator were added, after which 13.6 cc. of potassium hydroxide solution (N=1.72) was added gradually since on rapid addition an opalescence due to a fine precipitate was noted. After this addition, 1.46 g. of acetylacetone was added, then 2.59 cc. of potassium hydroxide was added. During the latter addition a copious precipitate formed. The precipitate was extracted with benzene and the solution was water-washed twice. After the benzene was evaporated, 1.22 g. of white solid remained; this represents a yield of 77.2% of indium acetylacetonate (based on indium trichloride). The melting point of the crude solid was 185.4–186.5° C.

EXAMPLE X

| Materials | Theoretical, Grams | Experimental, Grams |
|---|---|---|
| Indium Trichloride Solution (containing 58.3% InCl₃) | | 1.581 |
| Malic Acid (3 M. A.:2InCl₃) | 0.840 | 0.858 |
| Sodium Carbonate | 1.326 | 1.327 |
| Acetylacetone | 1.255 | 1.460 |

Procedure

Malic acid (2.01 cc., N=6.37) was added to the InCl₃ solution contained in a 125 cc. glass-stoppered flask. A few drops of methyl orange indicator were added after which 14.64 cc. of sodium carbonate solution (N=1.71) was added. A slight amount of precipitate formed due to too rapid addition of the solution. When 1.46 g. of acetylacetone was added, a copious precipitate was formed. The precipitate was extracted with benzene and the solution was water-washed twice; after the benzene was evaporated, 1.316 g. of white solid remained. This represents a yield of 76.3% of indium acetylacetonate (based on indium trichloride). The melting point of the crude solid was 186.5–187.1° C.

EXAMPLE XI

| Materials | Theoretical, Grams | Experimental, Grams |
|---|---|---|
| Indium Trichloride Solution (containing 58.3% InCl₃) | | 1.396 |
| Malic Acid (3 M. A.:2InCl₃) | 0.740 | 0.769 |
| Ammonium Hydroxide | 0.772 | 0.852 |
| Acetylacetone | 1.110 | 1.460 |

Procedure

Malic acid (1.8 cc., N=6.37) was added to the InCl₃ solution contained in a 125 cc. glass-stoppered flask. A few drops of phenolphthalein indicator were added after which 4.84 cc. of ammonium hydroxide solution (N=5.03) was added. A slight opalescence was noted due, no doubt, to too rapid addition of the ammonium hydroxide. When 1.46 g. of acetylacetone was added, a copious precipitate was formed. The precipitate was extracted with benzene and the solution was water-washed twice; after the benzene was evaporated, 1.197 g. of white solid remained. This represents a yield of 78.7% of indium acetylacetonate (based on indium trichloride). The melting point of the crude solid was 187.1–187.6° C.

EXAMPLE XII

| Materials | Theoretical, Grams | Experimental, Grams |
|---|---|---|
| Indium Trichloride Solution (containing 58.3% InCl₃) | | 1.543 |
| Malic Acid (3 M. A.:2InCl₃) | 0.818 | 0.854 |
| Sodium Hydroxide | 0.976 | 1.110 |
| Acetylacetone | 1.230 | 1.370 |

Procedure

Malic acid solution (2.0 cc., N=6.37) was added to the InCl₃ solution contained in a 125 cc. glass-stoppered flask. A few drops of phenolphthalein indicator were added after which 7.5 cc. of sodium hydroxide (N=2.58) was added very gradually. A precipitate eventually formed; it was not soluble in water. At this point, 1.37 g. of acetylacetone were added. After shaking the contents of the flask, a precipitate formed. Then 3.23 cc. of sodium hydroxide solution was added to give a pink end-point. A benzene extraction was made of the precipitate; some insoluble material, no doubt In(OH)₃, remained. The benzene solution was water-washed, filtered, then evaporated. There remained 0.8365 g. of white solid. This represents a yield of 49.7%.

Since benzene-insoluble material, probably In(OH)₃ remained, it was desired to show that this was recoverable. To the wash waters and aqueous reaction mixture (after benzene extraction), 3 cc. (1.284 g.) of malic acid solution (N=6.37) was added, after which 8.2 cc. of sodium hydroxide solution (N=2.58) was added. On addition of 1.46 g. of acetylacetone and 3.9 cc. of sodium hydroxide solution (to give a pink end-point) a solid precipitate was obtained. On subsequent benzene extraction and water-washing the solution followed by evaporation of the benzene, 0.448 g. of white solid was obtained. This quantity plus that obtained above represents a yield of 76.6% of indium acetylacetonate (based on indium trichloride). The melting point of the crude solid was 186.5–187.1° C.

EXAMPLE XIII

| Materials | Theoretical, Grams | Experimental, Grams |
|---|---|---|
| Indium Trichloride Solution (containing 58.3% InCl₃) | | 6.178 |
| Ammonium Hydroxide (Assay (NH₃) 28.5% Sp. Gr. 0.9) | 1.710 | 2.050 |
| Acetylacetone | 4.920 | 5.104 |
| Water | | 35.000 |

Procedure

The indium trichloride solution was weighed into an Erlenmeyer flask; then 4.5 cc. of dilute ammonia (1 cc. NH₄OH [Assay (NH₃) 28.5%, specific gravity 0.90] in 10 cc. water) was added until a slight turbidity was noted. This mixture was poured into a 500 cc., 3-necked flask equipped with a stirrer, thermometer and reflux condenser. The acetylacetone was added, then 33.5 cc. of dilute ammonia was gradually added until no more turbidity was noticed. The materials were heated to 98.5° C.; the total reaction time was 3 hours. After cooling to room temperature the reaction mixture was suction filtered. The solids on the filter weighed 2.498 g. This material was insoluble in acetone and benzene; it did not burn when exposed to a flame temperature. It may be concluded that this material is not indium acetylacetonate but inorganic in nature.

EXAMPLE XIV

| Materials | Theoretical, Grams | Experimental, Grams |
|---|---|---|
| Indium Trichloride Solution (containing 58.3% InCl₃) | | 1.547 |
| Citric Acid (1 C. A.:1InCl₃) | .783 | .803 |
| Sodium Hydroxide | .978 | 1.380 |
| Acetylacetone | 1.260 | 1.460 |

Procedure

The indium trichloride solution was weighed into an Erlenmeyer flask and then 1.8 cc. of citric acid solution (N=6.92) was added to the flask. Next, 6.35 cc. of sodium hydroxide solution (N=2.58) was added gradually to avoid formation of indium hydroxide precipitate. On further addition of sodium hydroxide solution (0.55 cc.) insoluble material was apparent in the reaction medium; at this point 1.46 g. of acetylacetone was added followed by addition of a few drops of phenolphthalein solution. On shaking and gradual addition of 4.75 cc. of sodium hydroxide solution, a solid commenced to form and a pink coloration developed. Finally, 185 cc. of sodium hydroxide was added. The precipitate was extracted with benzene and then the benzene solution was water-washed until neutral. The benzene solution was filtered through a fluted filter; after the benzene was evaporated, 1.39 g. of white solid remained. This represents a yield of 82.3% of indium acetylacetonate (based on indium trichloride). The melting point of the crude solid was 184.5–186.5° C.

Modifications of this invention may be apparent to those skilled in the art. However, it is not intended that the scope of the invention be limited by details of the specific embodiments described herein, but only as indicated in the following claims.

We claim:

1. A method for preparing indium acetylacetonate which comprises (1) forming an aqueous solution of indium trichloride and an aliphatic hydroxypolycarboxylic acid, said solution containing approximately 1 equivalent weight of trivalent indium ion per equivalent weight of acid, (2) adding to the solution provided in step 1 an aqueous solution containing a basic compound selected from the alkali metal hydroxides, the alkali metal carbonates and ammonium hydroxide in sufficient amount to provide a pH therein in the alkaline range, (3) adding acetylacetone to the solution provided in step 2 to form a precipitate of indium acetylacetonate in said solution and (4) recovering the indium acetylacetonate thus formed.

2. A method for preparing indium acetylacetonate which comprises (1) forming an aqueous solution of indium trichloride and a hydroxypolycarboxylic acid selected from tartaric acid, citric acid and malic acid, said solution containing approximately 1 equivalent weight of trivalent indium ion per equivalent weight of acid, (2) adding to the solution provided in step 1 an aqueous solution containing a basic compound selected from the alkali metal hydroxides, the alkali metal carbonates and ammonium hydroxide in sufficient amount to provide a pH therein in the alkaline range, (3) adding acetylacetone to the solution provided in step 2 to form a precipitate of indium acetylacetonate in said solution and (4) recovering the indium acetylacetonate thus formed.

3. A method for preparing indium acetylacetonate which comprises (1) forming an aqueous solution of indium trichloride and a hydroxypolycarboxylic acid selected from tartaric acid, citric acid and malic acid, said solution containing approximately 1 equivalent weight of trivalent indium ion per equivalent weight of acid, (2) adding to the solution provided in step 1 an aqueous solution of an alkali metal hydroxide in sufficient amount to provide a pH therein in the alkaline range, (3) adding acetylacetone to the solution provided in step 2 to form a precipitate of indium acetylacetonate in said solution and (4) recovering the indium acetylacetonate thus formed.

4. A method for preparing indium acetylacetonate which comprises (1) forming an aqueous solution of indium trichloride and a hydroxypolycarboxylic acid selected from tartaric acid, citric acid and malic acid, said solution containing approximately 1 equivalent weight of trivalent indium ion per equivalent weight of acid, (2) adding to the solution provided in step 1 an aqueous solution of an alkali metal carbonate in sufficient amount to provide a pH therein in the alkaline range, (3) adding acetylacetone to the solution provided in step 2 to form a precipitate of indium acetylacetonate in said solution and (4) recovering the indium acetylacetonate thus formed.

5. A method for preparing indium acetylacetonate which comprises (1) forming an aqueous solution of indium trichloride and a hydroxypolycarboxylic acid selected from tartaric acid, citric acid and malic acid, said solution containing approximately 1 equivalent weight of trivalent indium ion per equivalent weight of acid, (2) adding to the solution provided in step 1 ammonium hydroxide in sufficient amount to provide a pH therein in the alkaline range, (3) adding acetylacetone to the solution provided in step 2 to form a precipitate of indium acetylacetonate in said solution and (4) recovering the indium acetylacetonate thus formed.

6. A method for preparing indium acetylacetonate which comprises (1) forming an aqueous solution of indium trichloride and tartaric acid, said solution containing approximately 1 equivalent weight of trivalent indium ion per equivalent weight of tartaric acid, (2) adding to the solution provided in step 1 ammonium hydroxide in sufficient amount to provide a pH therein in the alkaline range, (3) adding acetylacetone to the solution provided in step 2 to form a precipitate of indium acetylacetonate in said solution and (4) recovering the indium acetylacetonate thus formed.

7. A method for preparing indium acetylacetonate which comprises (1) forming an aqueous solution of indium trichloride and tartaric acid, said solution containing approximately 1 equivalent weight of trivalent indium ion per equivalent weight of tartaric acid, (2) adding to the solution provided in step 1 an aqueous solution of NaOH in sufficient amount to provide a pH therein in the alkaline range, (3) adding acetylacetone to the solution provided in step 2 to form a precipitate of indium acetylacetonate in said solution and (4) recovering the indium acetylacetonate thus formed.

8. A method for preparing indium acetylacetonate which comprises (1) forming an aqueous solution of indium trichloride and citric acid, said solution containing approximately 1 equivalent weight of trivalent indium ion per equivalent weight of citric acid, (2) adding to the solution provided in step 1 an aqueous solution of $Na_2CO_3$ in sufficient amount to provide a pH therein in the alkaline range, (3) adding acetylacetone to the solution provided in step 2 to form a precipitate of indium acetylacetonate in said solution and (4) recovering the indium acetylacetonate thus formed.

9. A method for preparing indium acetylacetonate which comprises (1) forming an aqueous solution of indium trichloride and citric acid, said solution containing approximately 1 equivalent weight of trivalent indium ion per equivalent weight of citric acid, (2) adding to the solution provided in step 1 ammonium hydroxide in sufficient amount to provide a pH therein in the alkaline range, (3) adding acetylacetone to the solution provided in step 2 to form a precipitate of indium acetylacetonate in said solution and (4) recovering the indium acetylacetonate thus formed.

10. A method for preparing indium acetylacetonate which comprises (1) forming an aqueous solution of indium trichloride and malic acid, said solution containing approximately 1 equivalent weight of trivalent indium ion per equivalent weight of malic acid, (2) adding to the solution provided in step 1 ammonium hydroxide in sufficient amount to provide a pH therein in the alkaline range, (3) adding acetylacetone to the solution provided in step 2 to form a precipitate of indium acetylacetonate in said solution and (4) recovering the indium acetylacetonate thus formed.

11. A method for preparing indium acetylacetonate which comprises (1) forming an aqueous solution of indium trichloride and tartaric acid, said solution containing approximately 1 equivalent weight of trivalent indium ion per equivalent weight of tartaric acid, (2) adding to the solution provided in step 1 ammonium hydroxide in sufficient amount to provide a pH in said solution which is alkaline and which has a value of approximately 8, (3) adding acetylacetone to the solution provided in step 2 to form a precipitate of indium acetylacetonate in said solution and (4) recovering the indium acetylacetonate thus formed.

12. A method for preparing indium acetylacetonate which comprises (1) forming an aqueous solution of indium trichloride and tartaric acid, said solution containing approximately 1 equivalent weight of trivalent indium ion per equivalent weight of tartaric acid, (2) adding to the solution provided in step 1 an aqueous solution of NaOH in sufficient amount to provide a pH in said solution which is alkaline and which has a value of approximately 8, (3) adding acetylacetone to the solution provided in step 2 to form a precipitate of indium acetylacetonate in said solution and (4) recovering the indium acetylacetonate thus formed.

13. A method for preparing indium acetylacetonate which comprises (1) forming an aqueous solution of indium trichloride and citric acid, said solution containing approximately 1 equivalent weight of trivalent indium ion per equivalent weight of citric acid, (2) adding to the solution provided in step 1 an aqueous solution of $Na_2CO_3$ in sufficient amount to provide a pH in said solution which is alkaline and which has a value of approximately 8, (3) adding acetylacetone to the solution provided in step 2 to form a precipitate of indium acetylacetonate in said solution and (4) recovering the indium acetylacetonate thus formed.

14. A method for preparing indium acetylacetonate which comprises (1) forming an aqueous solution of indium trichloride and citric acid, said solution containing approximately 1 equivalent weight of trivalent indium ion per equivalent weight of citric acid, (2) adding to the solution provided in step 1 ammonium hydroxide in sufficient amount to provide a pH in said solution which is alkaline and which has a value of approximately 8, (3) adding acetylacetone to the solution provided in step 2 to form a precipitate of indium acetylacetone in said solution and (4) recovering the indium acetylacetonate thus formed.

15. A method for preparing indium acetylacetonate which comprises (1) forming an aqueous solution of indium trichloride and malic acid, said solution containing approximately 1 equivalent weight of trivalent indium ion per equivalent weight of malic acid, (2) adding to the solution provided in step 1 ammonium hydroxide in sufficient amount to provide a pH in said solution which is alkaline and which has a value of approximately 8, (3) adding acetylacetone to the solution provided in step 2 to form a precipitate of indium acetylacetonate in said solution and (4) recovering the indium acetylacetonate thus formed.

ALFRED P. KOZACIK.
EDWIN M. NYGAARD.

References Cited in the file of this patent

Morgan et al.—Chem. Soc. Jour. (London), vol. 119, pages 1058–1063 (1921).

Stites et al.—Jour. Am. Chem. Soc., vol. 70, pages 3142–3143, Sept. 1948.